M. W. St JOHN.

Ball and Socket Joints.

No. 5,679. Reissued Dec. 9, 1873.

Witnesses:

Arnold Hornauer.

Wm. C. Dey

Inventor:

M. W. St John by his atty F. D. Stetson

New York lith

UNITED STATES PATENT OFFICE.

MILTON W. ST. JOHN, OF LEONARDSVILLE, NEW YORK.

IMPROVEMENT IN BALL-AND-SOCKET JOINTS.

Specification forming part of Letters Patent No. 79,408, dated June 30, 1868; antedated June 18, 1868; reissue No. 5,679, dated December 9, 1873; application filed November 15, 1873.

*To all whom it may concern:*

Be it known that I, M. W. ST. JOHN, of Leonardsville, in the county of Madison and State of New York, have invented a new and Improved Ball-and-Socket Joint; and I do hereby declare that the following is a full, clear, and exact description thereof.

I construct an improved ball-and-socket joint adapted to various purposes, as hereinafter described; and to enable those skilled in the art to make and use my invention, I will proceed to describe its construction and operation, reference being had to the accompanying drawings, forming a part of this specification, and to the letters of reference marked thereon.

Figure 1:
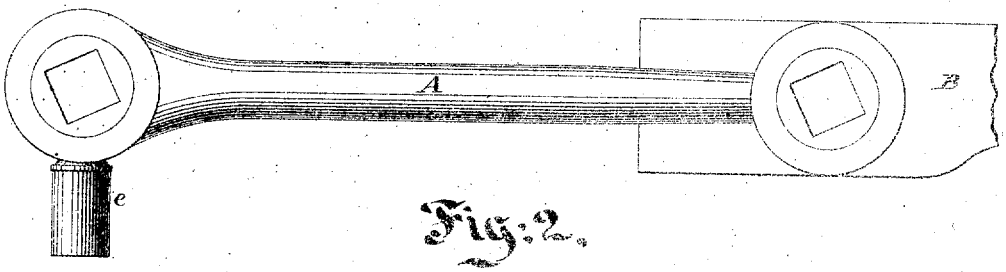
Figure 2:
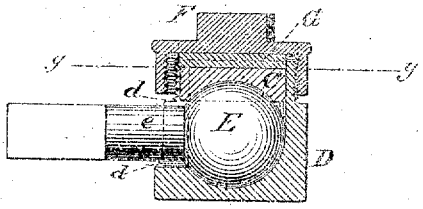
Figure 3:
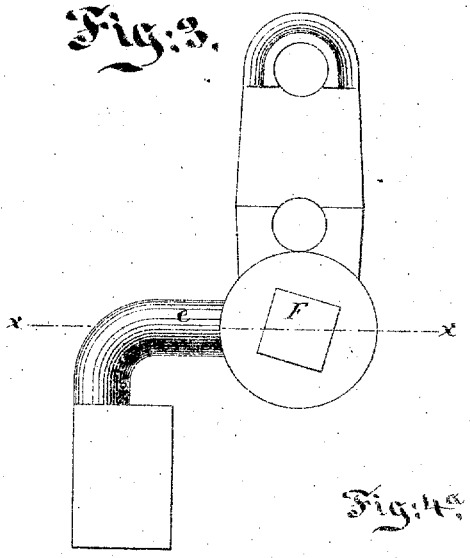
Figure 4:
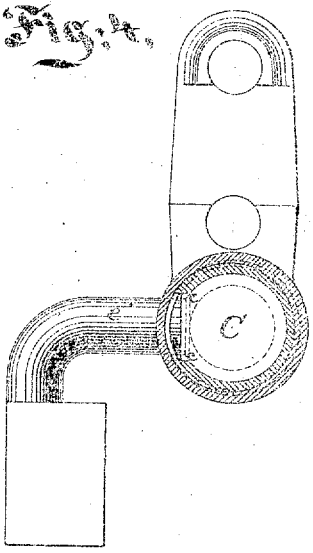
Figure 4A:
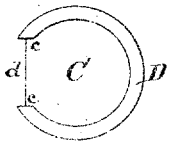

Figure 1 represents a top view of a pitman furnished with my improved joint at both ends. Fig. 2 represents a sectional view of the joint on the line *x x*, Fig. 3. Fig. 3 is a top view of the joint as adapted to shackles for shafts or pole to carriages, or other purposes than a pitman or connecting-rod. Fig. 4 represents a sectional view of Fig. 2 on the line *y y*. Fig. 4ª is an outline of some of the parts, showing more clearly the relation of the shoulders *c c* to the notch in the socket-piece D.

Similar letters indicate like parts.

Referring to Fig. 1, A is a pitman of a reaper, for instance, attached to the cutter-bar and the crank-wheel wrist. B is the cutter-bar, and *e* is the driving-wheel wrist.

In this example one end of the pitman forms a deep socket, and the other end a ball fitting into a similar deep socket in the cutter-bar. The wrist *e* of the driving-wheel terminates in a ball, which works in the socket of the pitman.

The construction and relation of the parts are more fully shown in Figs. 2, 3, 4, and 4ª, which represent a precisely similar joint applied to a different use.

The socket in the piece D is formed considerably deeper than the diameter of the ball E, and there is a deep notch, *d*, in the side, a little wider than the neck *e*, which connects to the ball E. The ball is made to fit the lower portion of the socket, and the notch *d* is made wide enough to allow as much play as is ever required for the vibration of the neck or wrist *e*. On the upper side of the ball E is fitted a piece of metal, C, concave on its under side, and smoothly finished to match to the ball E, and flat on its upper side. This piece C is formed with shoulders *c c*, which match within the notch *d* in the side of the socket-piece D, and serve to prevent the piece C from turning around, while it is free to move up and down, as required. Upon the upper plane face is placed a piece of rubber, or some other elastic material, G. The upper part of the exterior of the socket-piece D has a screw-thread cut around it, adapted to match to the screw-threaded cap F, which is screwed on, as shown in Fig. 2. The elastic piece G is pressed down by this cap, keeping the joint tight and clean, and tending to exclude dirt and dust.

The cap as here applied may be screwed down from time to time to compensate for wear. The elasticity of the piece G compensates for imperfections in the form of the ball E, and also compensates for wear within the limits of its elasticity, and more particularly when applied to pole or thill couplings for vehicles, where only a vibratory motion is given to the ball. The ball, if forged in proper dies, will require no further fitting on its surface. Even when used in actively-working machinery, as a pitman or connecting-rod, so nicely can this joint be adjusted by the elastic piece G that a few drops of oil contained in a chamber (not shown) at the bottom of the sockets will serve to keep the joint lubricated for a whole day. Besides all this, the joint is thereby made to work perfectly free and without noise. The elastic piece G is valuable in adjusting the joint to light and delicate machinery.

I do not confine myself to the use of this joint for any particular purpose. It may be employed to advantage in various ways, besides for reaping and mowing machines. It may be used as draft-connections of poles or thills to vehicles, and there are places in heavy as well as light machinery, as shafting and connecting-rods, where a noiseless joint is very desirable.

I propose adapting it to all situations where such a joint is desirable. Especially do I design to apply this joint to either or both ends of the pitman of a reaper, as I believe it would be very valuable in this connection, as it would allow the bar to be folded in any direction, and prevent its cramping if each end of the pitman should not work in parallel lines or direction.

Having thus described my invention, what I claim as new, and desire to secure by Letters Patent, is—

1. The deep socket-piece D, having a notch, *d*, in the side, in combination with the concave piece C, matched within the upper portion thereof, and with the ball E and neck *e*, as herein specified.

2. The adjustable cap F, in combination with the concave piece C, socket-piece D, notch *d*, and ball and neck E *e*, as herein specified.

3. The shoulders *c c* on the concave piece C, in combination with the notch *d* in the deep socket-piece D, and with ball and neck, and with a suitable cover or holding means, F, as herein specified.

4. A spring or elastic piece mounted over the concave piece C, in combination with the ball E, neck *e*, and deep-notched socket-piece D *d*, as herein specified.

5. The combination of the deep socket-piece D, ball E, concave piece C, rubber G, and cap F, when connected to the parts substantially in the manner and for the purposes specified.

In testimony whereof I have hereunto set my hand this 29th day of October, 1873, in the presence of two subscribing witnesses.

Witnesses: MILTON W. ST. JOHN.
WM. C. DEY,
ARNOLD HÖRMANN.